(12) United States Patent
Ruhe et al.

(10) Patent No.: US 9,468,217 B2
(45) Date of Patent: Oct. 18, 2016

(54) SHEETER WITH THICKNESS CONTROL

(71) Applicant: J.C. FORD COMPANY, La Habra, CA (US)

(72) Inventors: Scott D. Ruhe, Yorba Linda, CA (US); Peter A. Scherz, La Habra, CA (US)

(73) Assignee: J.C. Ford Company, La Habra, CA (US)

( * ) Notice: Subject to any disclaimer, the term of this patent is extended or adjusted under 35 U.S.C. 154(b) by 0 days.

(21) Appl. No.: 14/293,894

(22) Filed: Jun. 2, 2014

(65) Prior Publication Data

US 2015/0110938 A1    Apr. 23, 2015

Related U.S. Application Data

(63) Continuation of application No. 13/247,932, filed on Sep. 28, 2011, now Pat. No. 8,740,602.

(60) Provisional application No. 61/387,388, filed on Sep. 28, 2010.

(51) Int. Cl.
| | |
|---|---|
| *B23Q 17/00* | (2006.01) |
| *B29C 43/24* | (2006.01) |
| *A21C 1/00* | (2006.01) |
| *A21C 3/00* | (2006.01) |
| *A21C 3/02* | (2006.01) |

(52) U.S. Cl.
CPC ............. *A21C 1/006* (2013.01); *A21C 3/00* (2013.01); *A21C 3/021* (2013.01); *Y10T 29/49764* (2015.01)

(58) Field of Classification Search
CPC ................ A21C 1/006; A21C 3/021
USPC ............ 425/363, 367, 310, 202, 141, 194; 100/155 R, 160, 161, 163 R, 164, 100/168–171
See application file for complete search history.

(56) References Cited

U.S. PATENT DOCUMENTS

| | | | | |
|---|---|---|---|---|
| 2,008,036 | A | * | 7/1935 | Pointon .................. A21C 9/081 53/244 |
| 3,404,986 | A | * | 10/1968 | Wimmer ............... A23L 1/1041 426/386 |
| 4,212,609 | A | * | 7/1980 | Fay .......................... A21C 9/04 425/100 |
| 4,757,425 | A | * | 7/1988 | Waltz ..................... G03B 15/06 362/18 |
| 4,770,619 | A | | 9/1988 | Rijkaart |
| 5,112,208 | A | * | 5/1992 | Voth ........................ A21C 3/02 264/175 |
| 5,180,593 | A | | 1/1993 | Mistretta et al. |
| 5,411,390 | A | * | 5/1995 | Fay ...................... A23G 3/0289 425/145 |
| 5,470,599 | A | * | 11/1995 | Ruhe ............................ 426/231 |
| 5,580,583 | A | | 12/1996 | Caridis et al. |
| 5,720,990 | A | | 2/1998 | Lawrence et al. |
| 5,918,533 | A | | 7/1999 | Lawrence et al. |
| 6,024,554 | A | | 2/2000 | Lawrence |

(Continued)

*Primary Examiner* — Nahida Sultana
(74) *Attorney, Agent, or Firm* — Knobbe, Martens, Olson & Bear, LLP

(57) ABSTRACT

A thickness control system for a high speed tortilla sheeting machine can adjust a pinch point gap between a pair of sheeting rollers to maintain a generally uniform thickness of the produced "masa" (i.e., corn dough) sheet. The sheeting machine can include a pinch point gap adjustment device which guides at least one of the rollers through an arcuate path to thereby adjust a magnitude of the pinch point gap. The controller can direct one or more actuators to change the position of the roller along the archive path to thereby change the distance between the two sheeting rollers as desired to produce a masa sheet at the desired preset thickness.

8 Claims, 13 Drawing Sheets

(56) References Cited

U.S. PATENT DOCUMENTS

| | | | |
|---|---|---|---|
| 6,336,804 B1 * | 1/2002 | Wilson | 425/367 |
| 7,887,314 B2 | 2/2011 | Ruhe et al. | |
| 8,152,509 B2 | 4/2012 | Hanson et al. | |
| 8,347,480 B2 | 1/2013 | Ruhe et al. | |
| 8,740,602 B2 | 6/2014 | Ruhe et al. | |
| 2003/0185927 A1 * | 10/2003 | Morikawa et al. | 425/363 |
| 2003/0228388 A1 * | 12/2003 | Hayashi et al. | 425/363 |
| 2004/0091563 A1 * | 5/2004 | Saito et al. | 425/363 |
| 2004/0188874 A1 * | 9/2004 | Hikita et al. | 264/1.34 |
| 2005/0170031 A1 * | 8/2005 | Lambauer | A21C 3/04 425/363 |
| 2006/0033237 A1 * | 2/2006 | Graham et al. | 264/280 |
| 2008/0135582 A1 * | 6/2008 | Schmidt | A21C 11/16 222/272 |
| 2013/0266707 A1 * | 10/2013 | Fackelmann | A21C 5/003 426/502 |

* cited by examiner

SHEETER WITH THICKNESS CONTROL

PRIORITY INFORMATION

The present application is a continuation application of U.S. patent application Ser. No. 13/247,932, which is now a U.S. Pat. No. 8,740,602, filed Sep. 28, 2011, which claims priority under 35 U.S.C. §120 to U.S. Provisional Patent Application No. 61/387,388, filed Sep. 28, 2010, the entire contents of which is hereby incorporated by reference.

BACKGROUND OF THE INVENTIONS

1. Field of the Inventions and

The present inventions relate to improvements in high speed production sheeting devices for comestible products (e.g., tortillas and tortilla chips). More specifically, the present inventions relate to sheeting devices which control the spacing of rollers used to roll a comestible product to a desired thickness.

2. Description of the Related Art

Corn tortillas and tortilla chips are cut from a sheet of corn dough, called "masa," and then baked and/or fried. In mass production, the sheeting and cutting stages are accomplished by a tortilla sheeter.

High production tortilla sheeters feed masa from a hopper between a pair of large, stainless steel rollers which roll the masa into a sheet of substantially uniform thickness. The rollers are spaced apart in production to form a gap, known as a "pinch point gap," through which the masa passes. The masa adheres to the surface of one of the rollers, known as the exit roller, after passing through the pinch point gap. A third roller then cuts the masa into either tortillas or tortilla chips. The third roller, known as the cutting roller, commonly has either circular shaped (for tortillas) or triangular-shaped (for tortilla chips) cutting guides positioned on the cylindrical external surface of the cutting roller. The cut tortillas or chips then are stripped from the exit roller by a wire and/or a blower, or by a similar device.

High production tortilla sheeters automate virtually every step of the sheeting and cutting process. One challenge that remains, however, is to accurately control the thickness of the masa sheet before cutting.

The consistency of corn masa commonly varies over time depending upon humidity, temperatures, granularity, and other known factors, and occasionally will contain hard kernels of corn. If the distance between the sheeting rollers is rigidly fixed, the thickness of the exiting masa sheet will change depending on the masa consistency. The consistency of the masa can also vary within the hopper, and, thus, vary across the length of the sheeting rollers. As a result, the thickness of produced tortillas or chips undesirably varies.

Prior sheeting devices included computer controlled motors driving jack screws to guide one of the rollers along a linear path to thereby control the size of the pinch point gap. For example, FIGS. 1 and 2 illustrate such a known sheeting device.

With reference to FIG. 1, the known sheeting device 10 includes a roller component 14 and a drive component 16. A lower housing 18 houses the drive component 16. The drive component 16 includes a conventional electric motor (not shown) which drives the roller component 14 via a series of common gears and chains or belts (not shown), as known in the art. A conventional pneumatic control system controls the pneumatic devices of the sheeting device 10 (e.g., a stripping wire 44 and a cutting roller 38).

The roller component 14 rests on, or is attached to, the top of the lower housing 18 and includes a hopper 22 positioned above a pair of counter rotating rollers 24, 26. The front roller 24 and the rear roller 26 are generally cylindrical. The rollers can also have a roughened surface (obtained, for example, with sandblasting). The rollers 24, 26 desirably rotate at the same speed; however, it is understood that the rollers 24, 26 can rotate at different speeds if required by specific application.

The rollers 24, 26 are positioned parallel to each other and, as shown in FIG. 2, define a pinch point 28, i.e., the point at which the rollers 24, 26 contact or nearly contact each other. In operation, the rollers 24, 26 are spaced slightly apart to form a gap between the surfaces of the rollers 24, 26 at the pinch point 28.

With continued reference to FIG. 2, the hopper 22 is positioned above the rollers 24, 26 so as to contain masa 30 between the rollers 24, 26. As noted above, the term "masa" is used to denote a corn dough which is commonly used to form tortillas and tortilla chips. However, this type of sheeting device 10 can be used with other types of comestible products, such as, for example, grain-based doughs or doughy-like food mixtures.

The rear roller can be adjusted relative to the front roller to thereby vary the spacing between the rollers 24, 26, i.e., to vary the spacing of the size of the pinch point gap 28. Thus, as is known in the art, this type of sheeting device 10 includes an electric motor-driven jack screw arrangement 38 which allows the roller 26 to be slid along the axis 32 toward and away from the roller 24.

More specifically, as shown in FIG. 2, the rear roller 26 rotates about an axis defined by the axle 34. A movable bearing plate 36 supports one end of the axle 34 and another bearing plate (not shown) supports the opposite end of the axle 34. Each of the bearing plates 36 rides in a track (not shown) supported by the frame 39. A jack screw 38 is connected to each bearing plate 36 to move the corresponding bearing plate within the track.

The axis of the track, which defines the slide axis 32, is aligned with the longitudinal axes of both rollers 24, 26 and through the pinch point 28. Thus, movement of the bearing plates 36 within their tracks moves the rear roller 26 relative to the front roller 28 to vary the size of the pinch point gap 28.

This type of sheeting device 10 also includes a controller 54 which, through the use of various sensors, controls the jack screw drive to maintain the desired thickness of the masa 42 exiting the sheeting device 10.

SUMMARY OF THE INVENTIONS

An aspect of at least one of the embodiments disclosed herein includes the realization that the type of sheeting device described above with reference to FIGS. 1 and 2 can suffer from excessive movements of the various components forming the jack screw drive assembly. For example, elastic deformations of the screw itself, due to its length, can cause significant displacements of the roller as the forces produced by the masa changes. Additionally, the other bearings and joints requiring lubrication clearances can also contribute to unintended movements of the rollers during operation. These movements can be as great as $2/10,000^{ths}$ of an inch (0.0002 inches) every 20 seconds, or more. Although the system described above is actively controlled to adjust the thickness in response to these changes, the adjustments do not eliminate waste or unacceptable product discharged from the sheeter. Rather, even with the computer controlled thickness adjustment system included in the above-described sheeter 10 (as described in U.S. Pat. No. 5,470,599) there is a continuous stream of unacceptable product discharge from the sheeter due to unintended movement of the rear roller 26.

An aspect of at least one of the embodiments disclosed herein includes the realization that an eccentric pinch point adjustment system can eliminate several of the mechanical joints necessary for a jack screw drive and thereby reduce unintended movements of a roller of a sheeting device.

Thus, in accordance with at least one embodiment disclosed herein, a rolling device can include a support housing, a first roller having a first outer surface and supported by the first housing to rotate about a first axis, and a second roller having a second outer surface and supported by the housing to rotate about a second axis spaced from the first axis such that juxtaposed portions of the first and second outer surfaces define a pinch point gap. The roller device can also include at least a first pinch point gap adjustment mechanism comprising a rotatable roller mounting plate supported by the housing so as to be rotatable about a third axis and a mount supporting the first roller such that the first axis is offset from the third axis, thereby causing the first axis to revolve about the third axis when the roller mounting plate is rotated about the third axis and thereby changing a magnitude of the pinch point gap.

In accordance with another embodiment, a rolling device can comprise a support housing, a first roller having a first outer surface and supported by the first housing to rotate about a first axis, and a second roller having a second outer surface and supported by the housing to rotate about a second axis spaced from the first axis such that juxtaposed portions of the first and second outer surfaces define a pinch point gap. Additionally, the rolling device can include a first pinch point gap adjustment means for revolving the first axis about a third axis spaced from the first axis and changing a magnitude of the pinch point gap.

In accordance with yet another embodiment, a method of adjusting a spacing of two rollers can comprise supporting a first roller so as to rotate about a first axis, supporting a second roller so as to rotate about a second axis spaced from the first axis such that juxtaposed portions of outer surfaces of the first and second rollers define a pinch point gap, and revolving the first roller such that the first axis revolves about a third axis spaced from the first and second axes thereby changing a magnitude of the pinch point gap.

BRIEF DESCRIPTION OF THE DRAWINGS

The above-mentioned and other features of the inventions disclosed herein are described below with reference to the following drawings. The illustrated embodiments of the sheeter are intended to illustrate, but not to limit, the inventions.

DETAILED DESCRIPTION OF THE PREFERRED EMBODIMENT

The inventions disclosed herein have applicability to sheeters used in conjunction with continuously moving conveyor systems. However, an understanding of the inventions disclosed herein is facilitated with the following description of the application of the principles of the present inventions to dough rolling, and in particular, rolling dough into tortillas and tortilla chips. In some embodiments, the inventions disclosed herein can be used in conjunction with sheeters that have a sheet thickness control system, such as that disclosed in U.S. Pat. No. 5,470,599, the entire contests of which is hereby incorporated by reference. In particular, in some embodiments, the eccentric pinch point adjustment devices and the associated methods of operation disclosed herein can be used in place of the jack-screw type thickness adjustment hardware disclosed in U.S. Pat. No. 5,470,599, while using the same control system electronics, including the controllers, sensors, etc. as that disclosed in U.S. Pat. No. 5,470,599, or other similar control systems.

Figure 1:
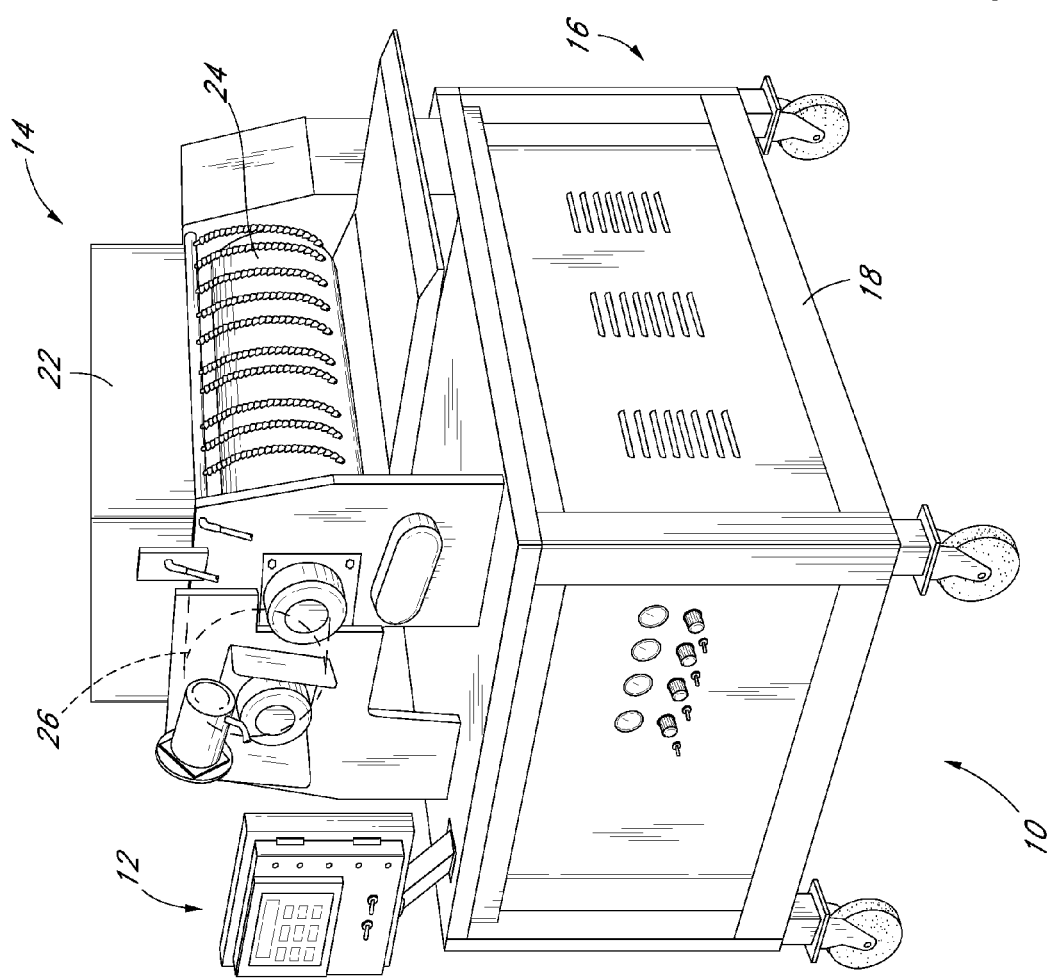
FIG. 1 is a top, front, and right side perspective view of a prior art sheeting device.
Figure 2:
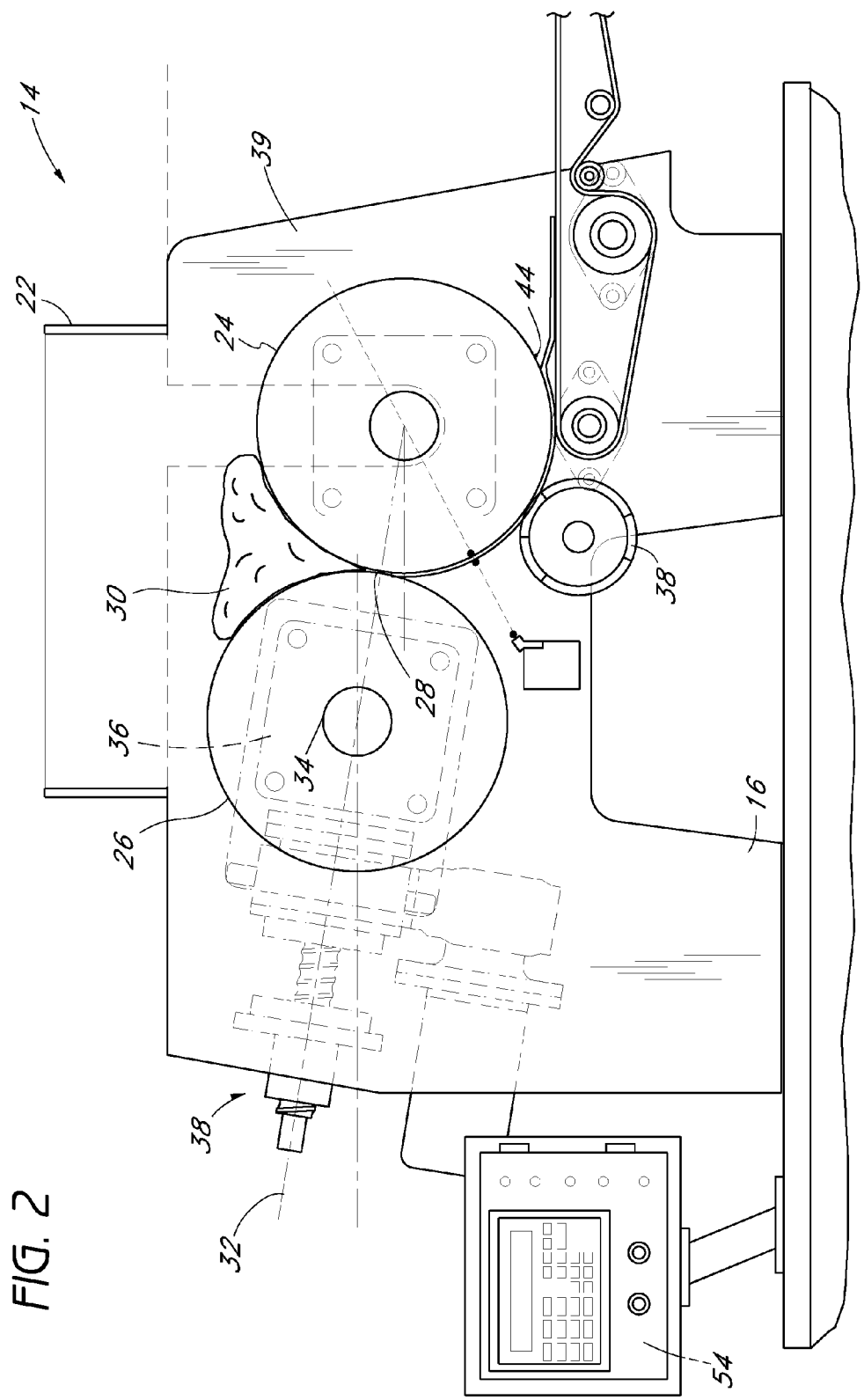
FIG. 2 is an enlarged and partial right side elevational view of the prior art sheeting device of FIG. 1.
Figure 3:
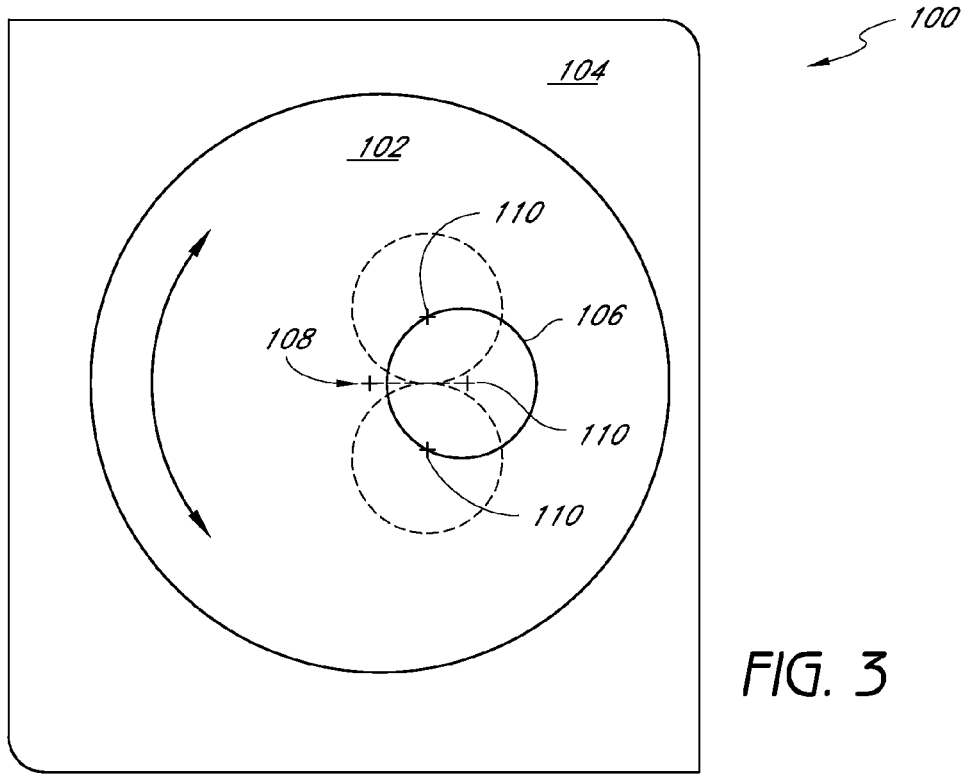
FIG. 3 is a schematic representation of an eccentric adjustment device which can be used with any of the embodiments disclosed herein.

With reference to FIG. 3, an eccentric mechanism 100 which can be configured to adjust a pinch point gap between rollers, can include a shaft mount 102 rotatably mounted within a frame 104. The shaft mount 102 can be in the form of a circular and rotatable member having a shaft aperture 106.

In the illustrated embodiment, the shaft mount 102 is rotatable about its center axis 108 relative to the support frame 104. In an initial position of the shaft mount 102, a center 110 of the aperture 106 is in an initial position. However, as the mount 102 is rotated clockwise relative to the frame 104, the center 110 of the aperture 106 also moves clockwise. Similarly, when the mount 102 is rotated counter-clockwise, the center 110 of the aperture 106 also moves counter-clockwise.

Figure 4:
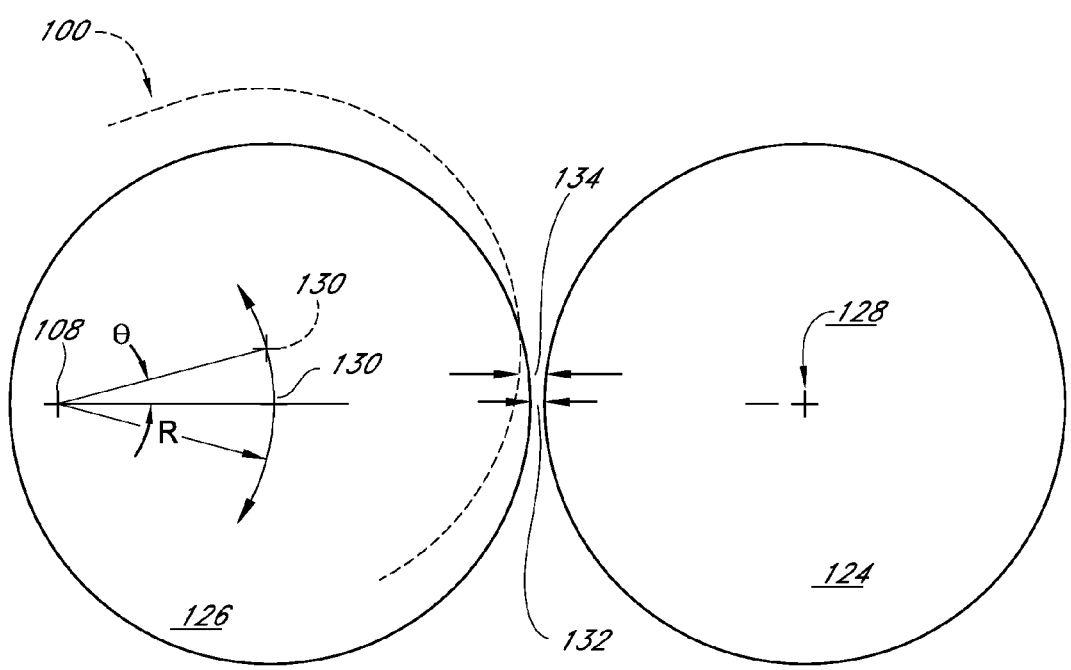
FIG. 4 is a schematic diagram of two rollers of a sheeting device in which one of the rollers is adjustable with the eccentric adjustment device of FIG. 3.

With reference to FIG. 4, the eccentric adjustment device 100 is illustrated as adjusting a magnitude of a pinch point gap between two rollers of a comestible product sheeter. For example, FIG. 4 schematically illustrates the rollers 124, 126 of a comestible product sheeter. In the illustrated embodiment, the roller 124 rotates about an axis 128. The axis 128 can be defined by fixed bearings and an axle (not shown), or it can be mounted so as to be movable. Such bearings can serve as a support configured to allow the roller 124 to rotate about the axis 128.

The roller 126 can be mounted with bearings and an axle so as to rotate about axis 130. Additionally, in the illustrated embodiment, the axle of the roller 126 can be mounted to an eccentric adjustment device, such as the eccentric adjustment device 100 illustrated in FIG. 3.

When the adjustment device 100 is adjusted such that the axles 128 and 130 are closest to each other, the pinch point gap 132 between the rollers 124, 126 is at its smallest magnitude, i.e., the rollers 124, 126 are at their closest possible position.

When the mount 102 is rotated counter-clockwise over an angle θ, the axis of rotation 130 of the roller 126 also moves counter-clockwise over an angle θ about axis 108. In this position, the pinch point gap grows to a larger pinch point gap 134, based on the radius R and the angle θ. Thus, by controlling the rotation of mount 102, the size of the pinch point gap 132 can be controlled.

Figure 5:
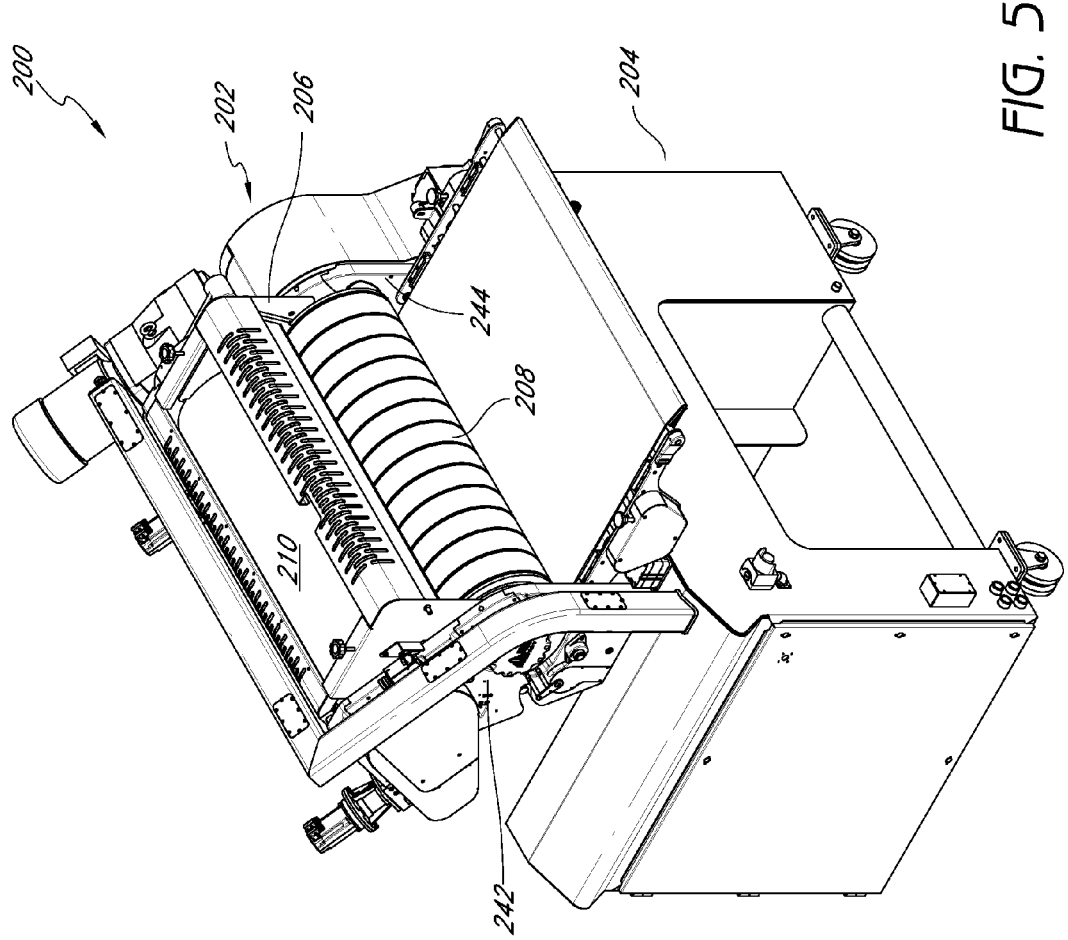
FIG. 5 is a top, front, and right side perspective view of a sheeting device in accordance with an embodiment.

FIG. 5 illustrates an embodiment of a comestible product sheeter 200 including an eccentric pinch point adjustment mechanism. The illustrated comestible product sheeter 200 includes a roller assembly 202 supported above a housing 204. The housing 204 can house electronics, power connections, components of a control system, etc. In the illustrated embodiment, the housing 204 is wheeled for convenient placement and servicing.

The roller system 202 can include a hopper 206 positioned above a pair of counter-rotating rollers 208, 210. The rollers 208, 210 can be generally cylindrical. In some embodiments, the rollers 208, 210 have a slightly roughened surface (obtained, for example, by sandblasting). The rollers 208, 210 can be driven at the same speed; however, the rollers 208, 210 can also be rotated at different speeds depending on the desired effect and application.

The rollers 208, 210 are generally positioned parallel to each other so as to define a pinch point therebetween, as described above with reference to FIG. 4. In some embodiments, the rollers 208, 210 can be mounted and sized such that, in their original or "brand new" state, the outer surface of the rollers 208, 210 would contact each other and/or interfere with each other if the adjustment mechanism used to adjust the position of the rotational axis of the roller 210 were set at its minimum pinch point gap position. This can be particularly advantageous because, over time, the outer surfaces of the rollers 208, 210 will become deformed and/or wear away. As such, the rollers 208, 210 may be removed from the sheet device 200 to be resurfaced. When the rollers 208, 210 are resurfaced, the diameters of the rollers 208, 210 are reduced. Thus, by mounting the rollers 208, 210 such that they would interfere with each other were they positioned in the minimum pinch point gap position, the pinch point gap adjustment mechanism can accommodate the smaller size of the rollers 208, 210 after resurfacing yet still achieve the desired magnitude of the pinch point gap.

Figure 6:
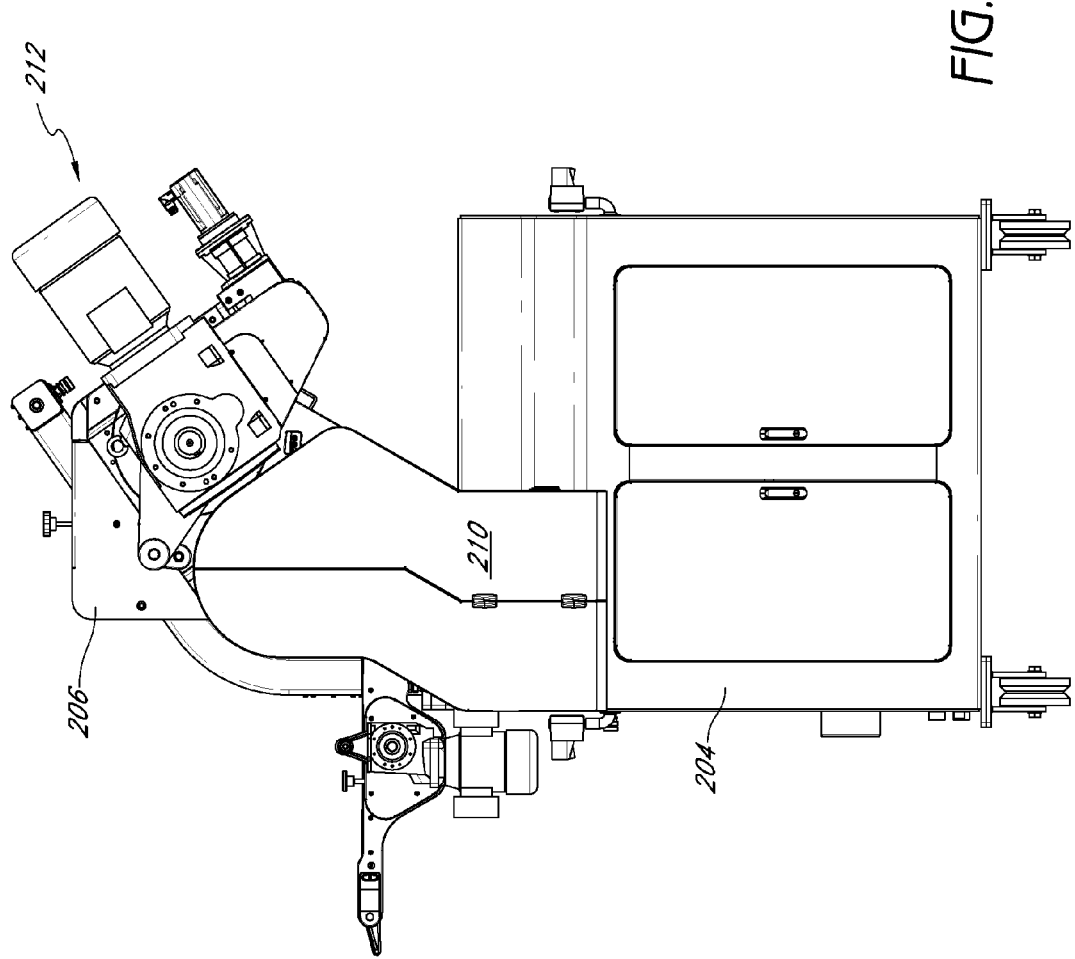
FIG. 6 is a left side elevational view of the sheeting device of FIG. 5.

With reference to FIG. 6, the hopper 206 can be configured to contain masa (corn-based dough) between the rollers 208, 210. As noted above, the term "masa" is used to refer to a corn dough which is commonly used to form tortillas or tortilla chips. However, it is understood that the present sheeter device 200 can be used with other types of comestible products, such as, for example, grain-based doughs, doughy food mixtures, or other substances.

A drive system for the roller 208 can be disposed in the housing 204. FIG. 6 illustrates a drive cover 210 which covers the drive system for the roller 208. Such a drive system can be configured in any known manner.

In the illustrated embodiment, the roller 210 is mounted to as to be movable relative to the roller 208. More specifically, the rotational axis of the roller 210 can be moved relative to the rotational axis of the roller 208, described in greater detail below.

Figure 7:
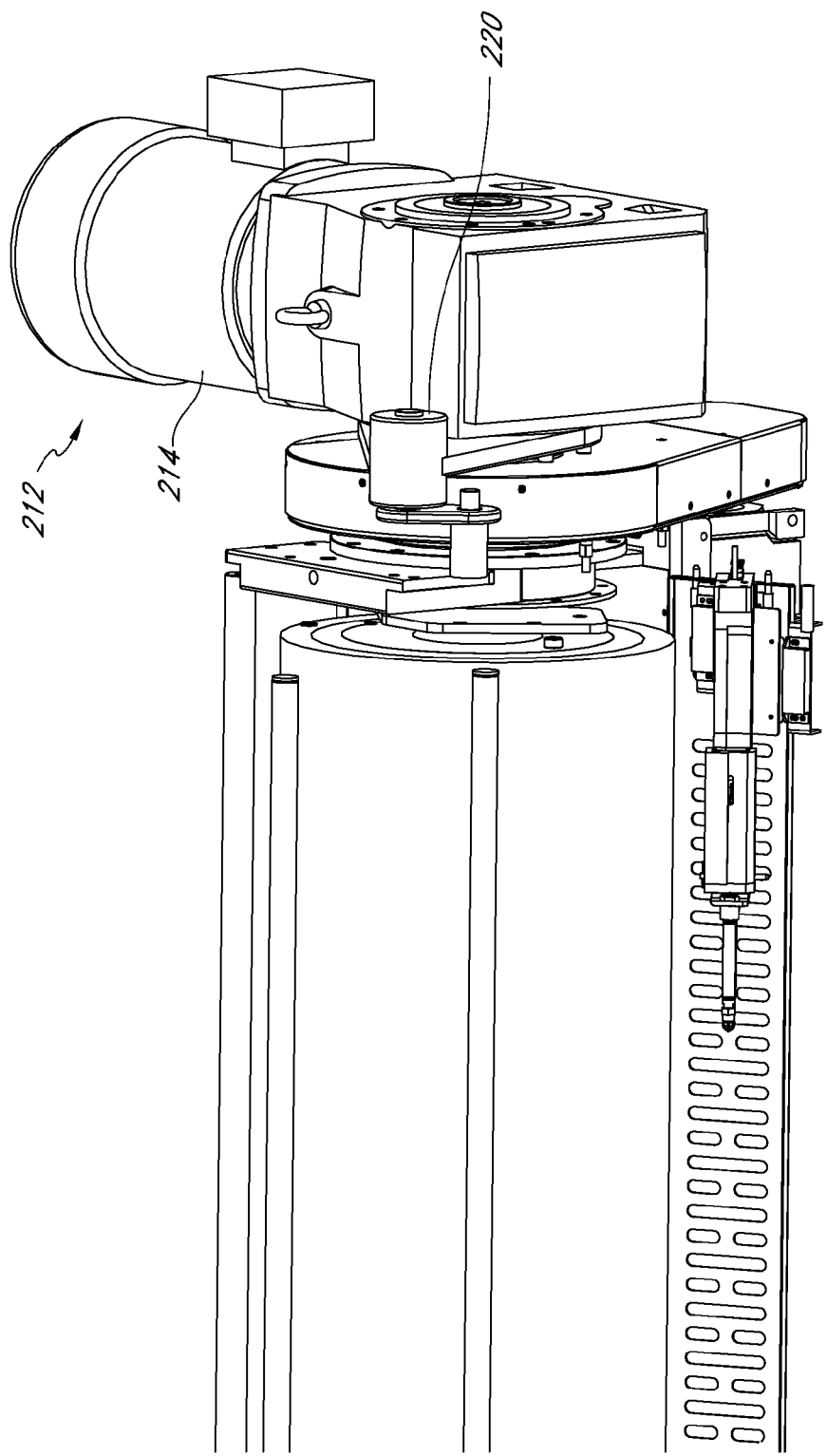
FIG. 7 is an enlarged, front, top, and left side perspective view of a roller drive of the sheeter illustrated in FIG. 6.
Figure 8:
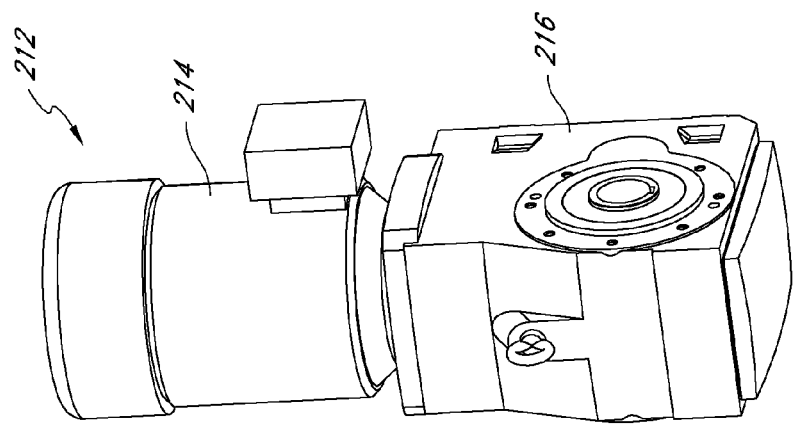
FIG. 8 is a bottom, front, left side perspective, exploded view of the roller drive of FIG. 7.
Figure 8:
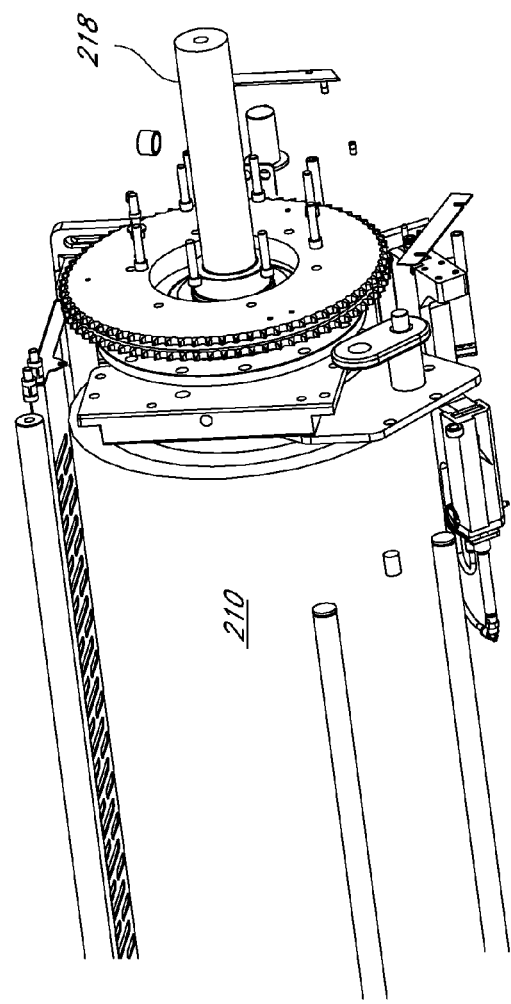

The drive system 212 for the roller 210 can be constructed using any known motor, such as stepper motors or server motors, and gear reduction drives. With reference to FIGS. 7 and 8, the drive system 212 can include an electric motor 214 and a gear reduction drive 216. The gear reduction drive 216 can be mounted directly to an axle 218 of the roller 210. In this arrangement, the drive system 212 thus moves as the position of the axle 218 is moved, described in greater detail below. Thus, in the illustrated embodiment, the drive 212 is connected to a portion of the housing 204 with a linkage assembly 220. The linkage assembly 220 prevents the drive system 212 from rotating relative to the housing 204, and thus ensures proper transference of rotational energy from the motor 214 to the axle 218

Figure 9:
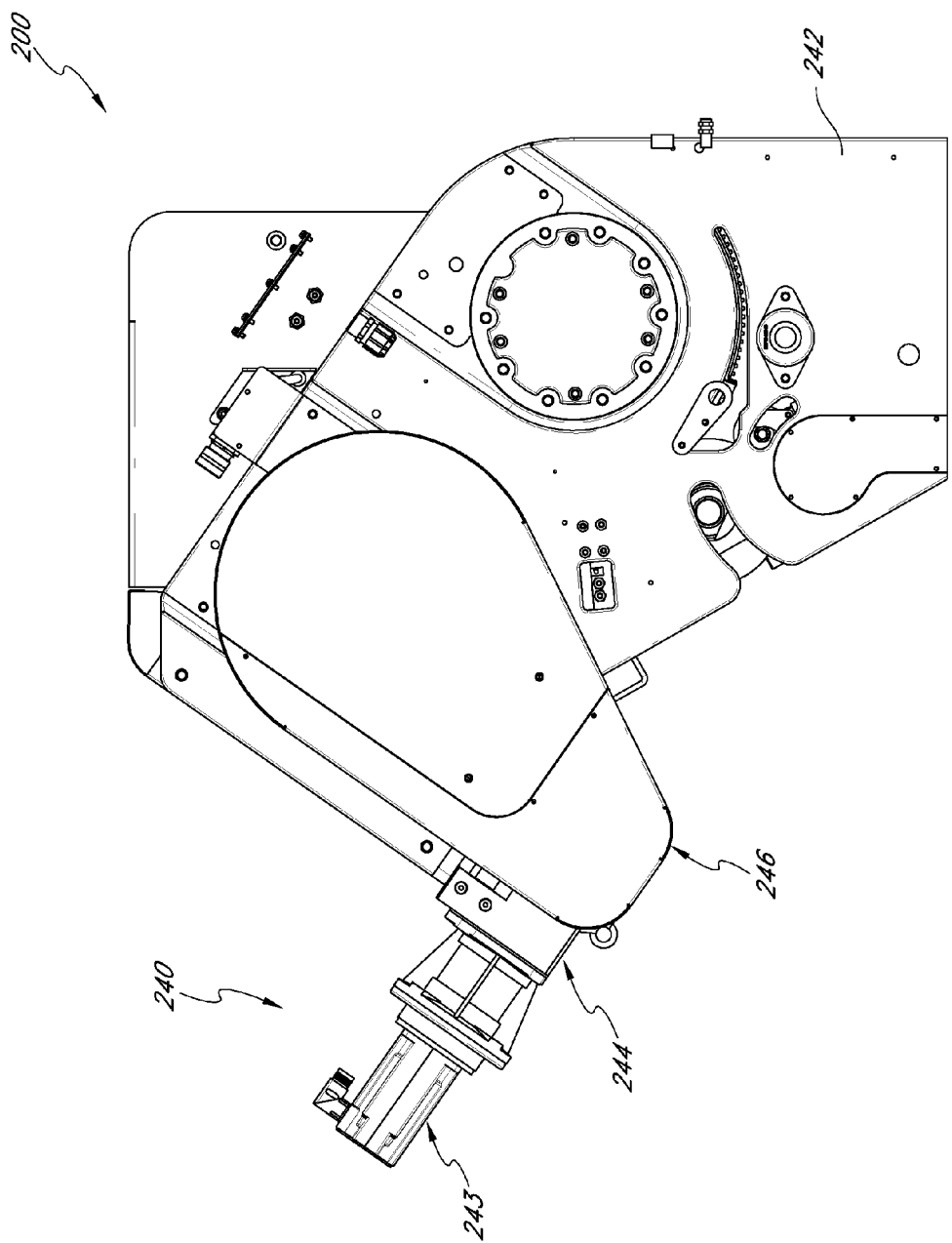
FIG. 9 is an enlarged and partial right side elevational view of the sheeter device of FIG. 5.

With reference to FIG. 9, the sheeter 200 can also include two support plates 242, 244 located at opposite sides of the housing 204. FIG. 9 includes a right side elevational view of the plate 242. The plates 242, 244 support both of the rollers 208, 210, as well as other devices.

The plate 242 can be made from any desired material. It is most common in the food industry to use stainless steel for all components that will come into contact with any food product. Additionally, the illustrated embodiment is designed to roll masa. As such, the plates 242, 244 should be designed to withstand approximately 10,000 pounds of force each. In practice, during operation, a sheet such as the sheeter 200 can experience loads of about 15,000 pounds between the rollers, i.e., the masa being squeezed between the rollers 208, 210 experts about 15,000 pounds of pushing force pushing the rollers 208, 210 away from each other. Thus, the plates 242, 244, in some embodiments, can be made from stainless steel of a thickness of about 1" or greater.

The adjustment drive system 240 can include an electric motor 242 and a gear reduction device 243. The gear reduction device can be used to drive a chain drive mechanism covered by a chain drive cover 246. In some embodiments, the sheeter 200 can include to adjustment drive systems located at opposite ends of the roller 210. However, in the description set forth below, only one adjustment drive system 240 is described. It is to be understood that in some embodiments, an identical adjustment drive system 240 can be disposed at the opposite end of the roller 210.

Figure 10:
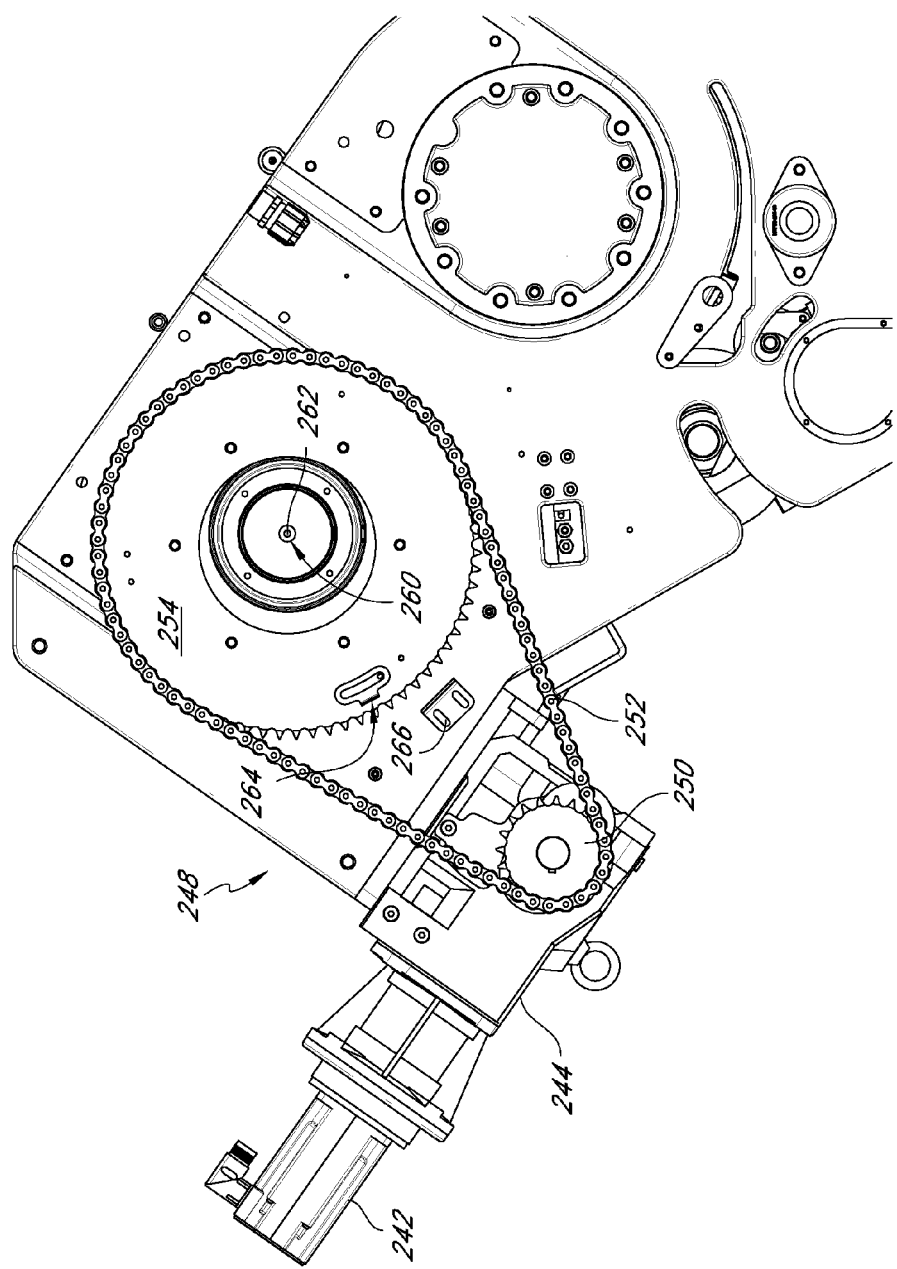
FIG. 10 is a right side elevational view of the sheeter device illustrated in FIG. 9, with an eccentric drive cover removed.
Figure 11:
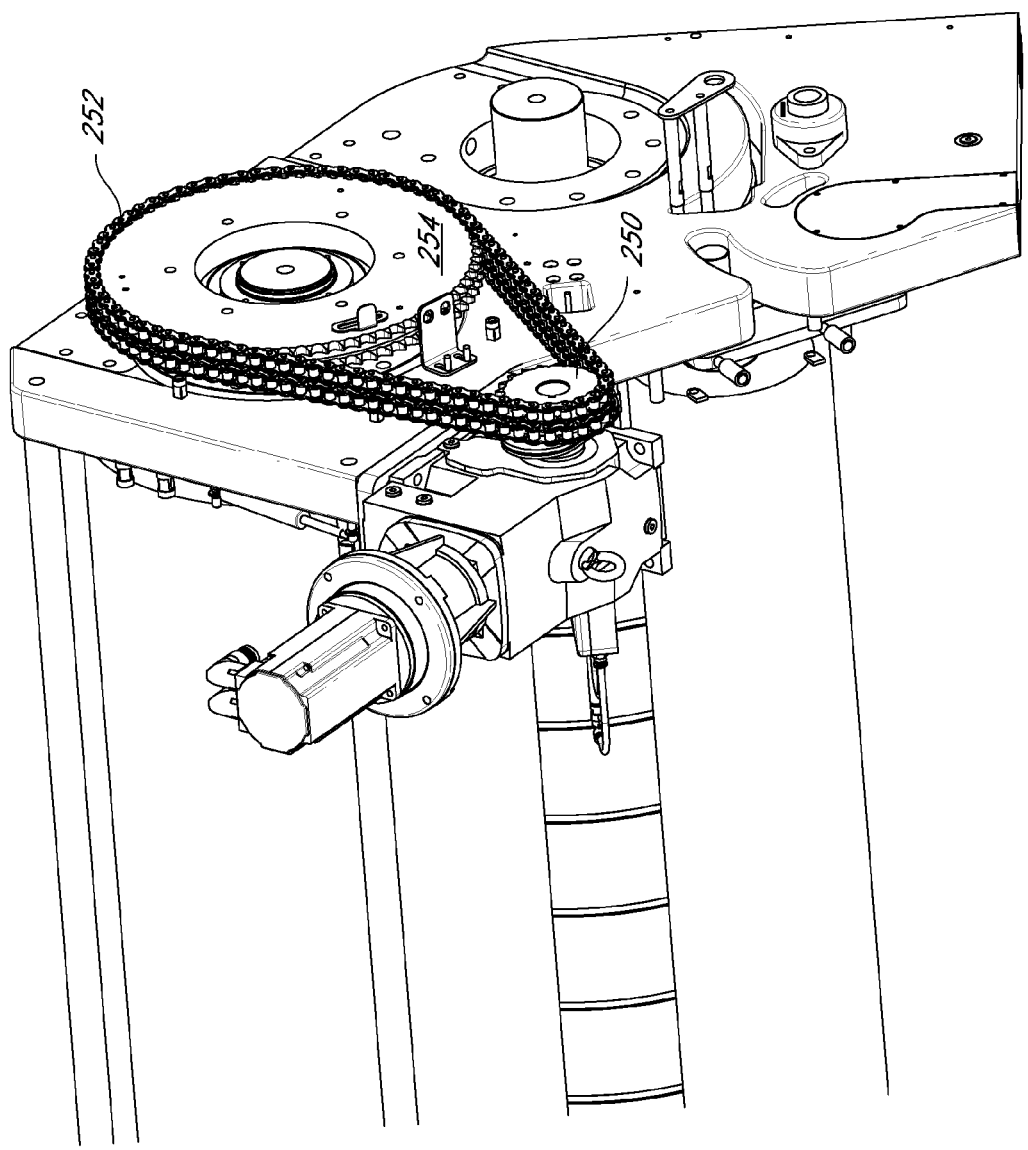
FIG. 11 is a rear, top, and right side perspective view of the eccentric drive mechanism illustrated in FIG. 10.

With reference to FIGS. 10 and 11, the chain drive cover 246 has been removed exposing the chain drive assembly 248. The chain drive assembly 248 can include a drive spur 250, a drive chain 252, and a driven spur 254. In the illustrated embodiment, the drive 248 is a double chain arrangement. Thus, the drive spur 250 has two sets of teeth in the form of a double spur, there are two chains 252, and the driven spur 254 has two sets of teeth just as the drive spur 250. As shown in FIG. 10, the rotational axis 260 of the driven spur 254 is offset from the rotational axis 262 of the roller 210.

In some embodiments, a position tab 264 can be mounted on the driven spurs 254 to aid in sensing a rotational position of the driven spurs 254. For example, in some embodiments, proximity sensors or other types of sensor can be mounted to a sensor bracket 266 so as to detect the presence of the position tab 264 and thus provide a means for an associated control system to determine the rotational position of the drive spur 255. Other sensors can also be used, such as any of those disclosed in U.S. Pat. No. 5,470,599, or any other sensors.

Figure 12:
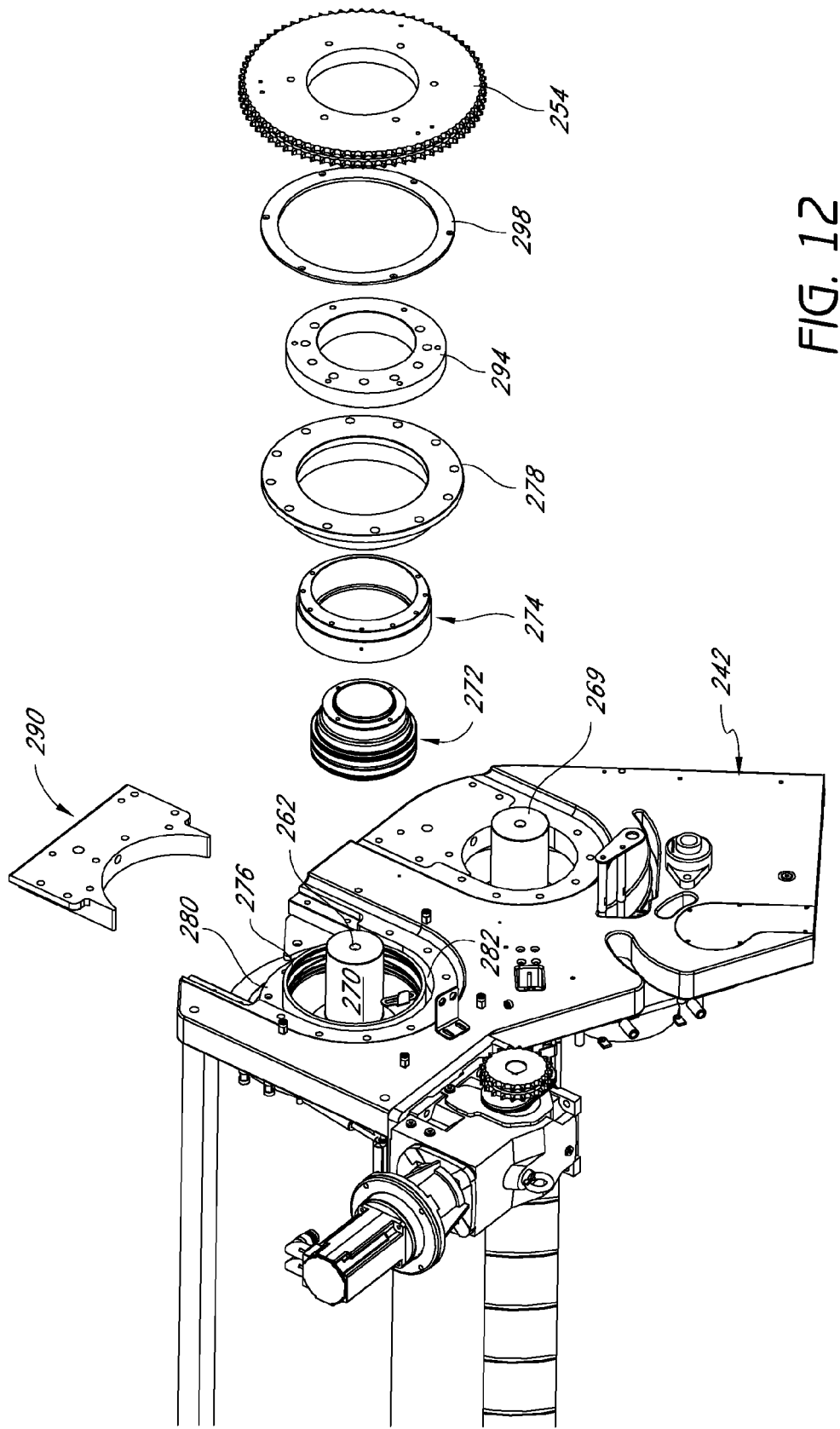
FIG. 12 is an exploded view of some of the components of the eccentric adjustment mechanism illustrated in FIG. 12.
Figure 13:
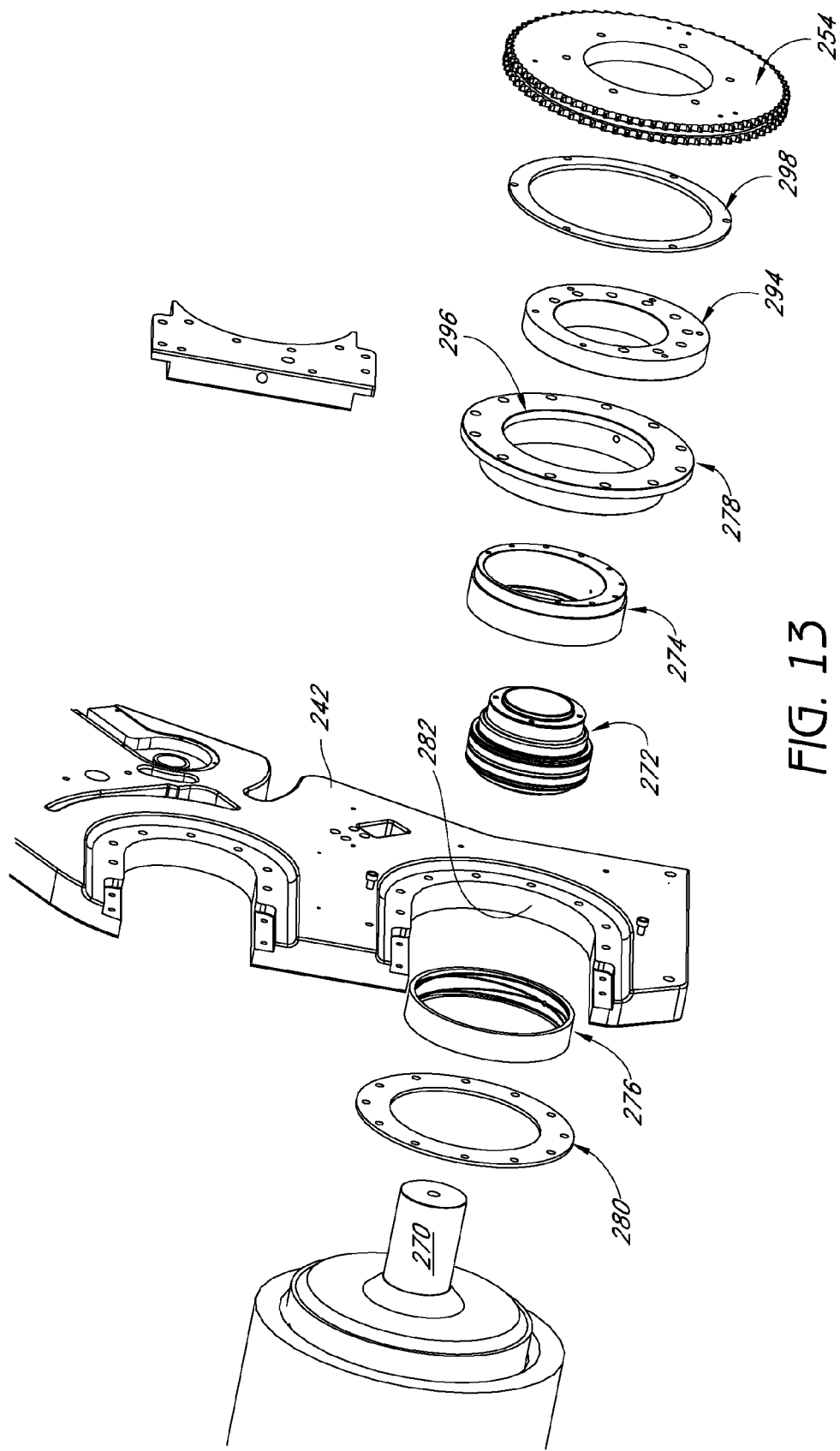
FIG. 13 is a further exploded view of a portion of the eccentric adjustment mechanism illustrated in FIG. 12.
Figure 14:
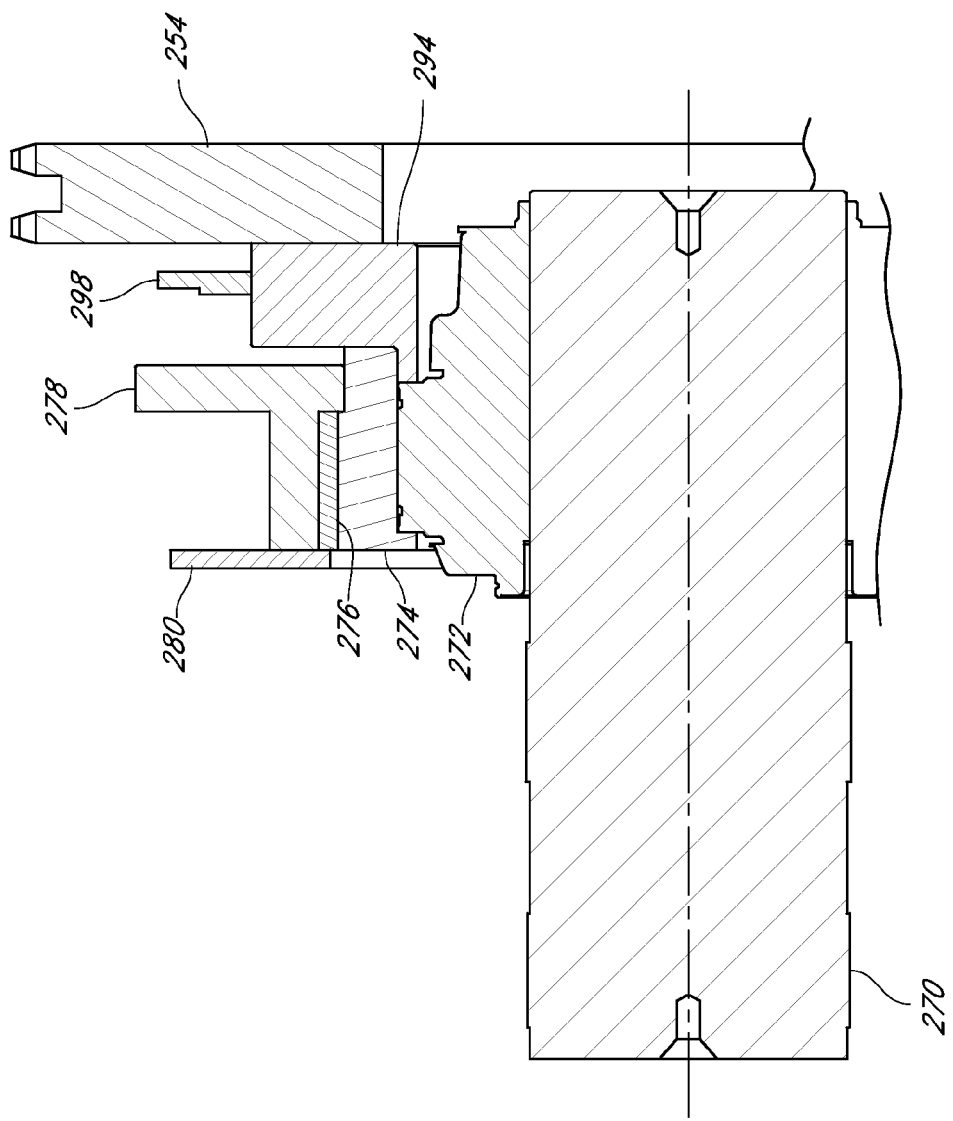
FIG. 14 is a sectional view of a portion of the eccentric drive mechanism of FIG. 13.

FIGS. 12 and 13 illustrate exploded views of the eccentric drive assembly for changing the spacing of the rotational axis 262 of the roller 210 relative to the rotational axis 269 and of the roller 208. FIG. 14 illustrates a cross-sectional view of the eccentric drive assembly in an assembled state and.

With continued reference to FIGS. 12, 13, and 14, the roller 210 includes an axle 270. The axle 270 is supported by a bearing 272, which can be in the form of a roller bearing unit. The outer surface of the bearing 272 is designed to rest within an eccentric adjustment plate 274. As illustrated in FIG. 13, the inner bore of eccentric adjustment plate 274 has an axis that is offset from the axis of the outer surface of the eccentric adjustment plate 274.

The outer surface of the eccentric plate 274 is designed to fit within the bearing sleeve 276. Retaining plates 278, 280 secure the bearing 272, eccentric plate 274, and the sleeve 276 within a u-shaped recess 282 formed in the plate 242.

With reference to FIG. 12, the plate 242 also includes a removable journal 290. With the journal 290 inserted into the u-shaped recess 282, the retaining plates 280 and 278 can be bolted to each other, through a series of bolt holes provided around the u-shaped recess 282 and the journal member 290. As such, as shown in FIG. 14, the retaining plates 278, 280 and the journal 290 are all fixed relative to the plate 242.

An additional eccentric drive plate 294 can also be partially journaled within the inner bore 296 of the eccentric plate 274. Additional bolts can be extended through the bolt hole patterns in the driven spurs 254, retaining ring 298, the eccentric drive plate 294 and the eccentric plate 274. As such, the driven spurs 254 are rotationally coupled with the eccentric plate 274. Thus, as the drive spurs 254 are rotated, the bearing 272 and thus the axle 270 of the roller 210 revolve along a circular path about the axis 260, thereby changing the spacing between the rotational axis 262 relative to the rotational axis 269 of the roller 208, and thereby change the spacing between the outer surfaces of the rollers, i.e., the "pinch point gap".

As noted above, the sheeter device 200 can include a control system configured to control the speed of the rollers 208, 210, as well as the roller spacing drive system 248. Such a control system can include various sensors, feedback control system components, actuators, and user interface devices. Such a control system is disclosed in U.S. Pat. No. 5,470,599 which is hereby expressly incorporated by reference. For example, such a control system can include a controller device and at least one sensor configured to detect a magnitude for the pinch point gap. The controller device, can be configured to drive the adjustment drive system 240 so as to adjust the detected size of the pinch point gap, as detected by the sensor, to a desired magnitude, which can be input into the controller device by a user. Such a configuration and programming of the controller device is within the skill of one of ordinary skill in the art, in light of the disclosure above and that set forth in U.S. Pat. No. 5,470, 599.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The invention claimed is:

1. A method of adjusting a spacing of two rollers, comprising:
    driving a first roller about a first axis with a first drive mechanism comprising a first motor, the first drive mechanism directly connected to the first roller which is supported by a support housing;
    supporting a second roller with the support housing so as to rotate about a second axis spaced from the first axis such that juxtaposed portions of outer surfaces of the first and second rollers define a pinch point gap;
    revolving the first roller and the first drive mechanism including the first motor, such that the first axis, the first roller, and the first motor revolve about a third axis spaced from the first and second axes thereby changing a magnitude of the pinch point gap; and
    preventing the first drive mechanism from rotating relative to the support housing with a linkage connecting the first drive mechanism to the support housing.

2. The method according to claim 1, wherein the step of revolving comprises revolving a roller mounting plate which supports the first roller relative to the support housing.

3. The method according to claim 1, wherein the step of supporting comprises supporting the first roller with a first roller bearing unit and a first axle extending through the first axis, the first axle being supported by the first roller bearing unit.

4. The method according to claim 1, additionally comprising detecting a magnitude of the pinch point gap, wherein the step of revolving comprises revolving of the first roller to change the pinch point gap based on the detected magnitude of the pinch point gap.

5. The method according to claim 1, additionally comprising pressing dough with the first and second rollers into a sheet of dough having a generally uniform thickness.

6. The rolling device according to claim 1, additionally comprising imparting a load of 15,000 pounds between the first and second rollers with dough disposed in the pinch point gap.

7. The rolling device according to claim 1 additionally supporting the first motor and the first roller together with the support housing.

8. The rolling device according to claim 1 additionally comprising mounting the first motor directly on a shaft of the first roller, wherein driving the first roller comprises rotating the first shaft about the first axis with the first motor.

* * * * *